Figure 1:
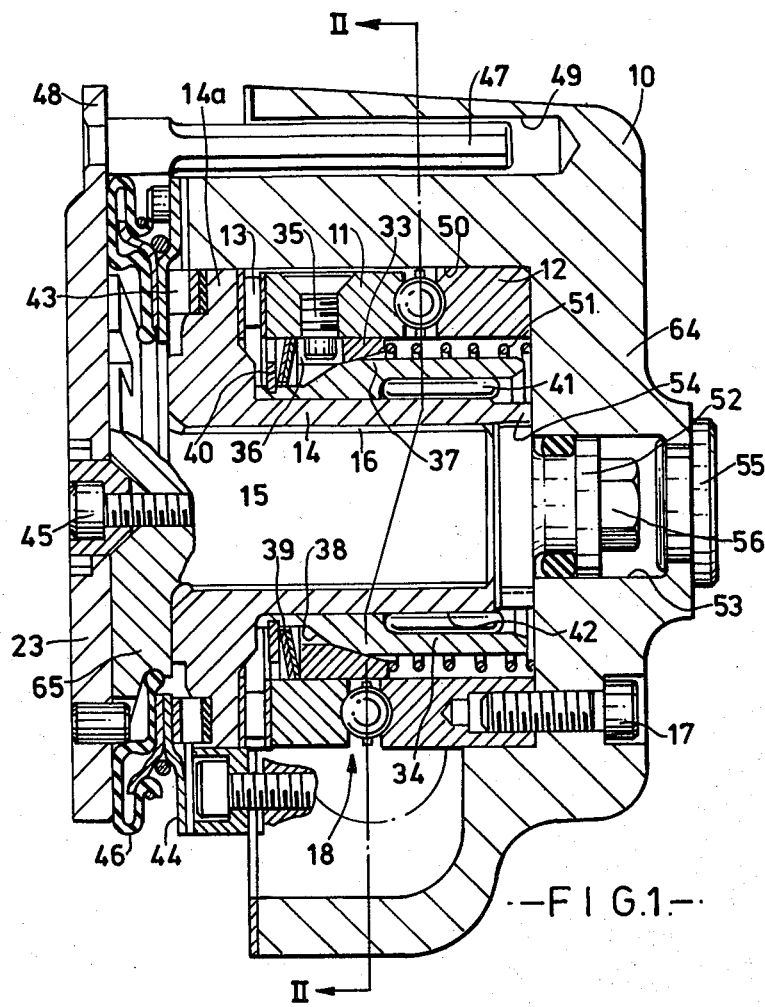

United States Patent [19]

Margetts et al.

[11] 4,429,768
[45] Feb. 7, 1984

[54] BRAKES

[75] Inventors: Hugh G. Margetts, Leamington Spa; Charles H. Pace, Solihull, both of England

[73] Assignee: Lucas Industries Limited, Birmingham, England

[21] Appl. No.: 898,865

[22] Filed: Apr. 21, 1978

[30] Foreign Application Priority Data

Apr. 22, 1977 [GB] United Kingdom ............. 16763/77

[51] Int. Cl.³ ............................................. F16D 55/08
[52] U.S. Cl. .................................. 188/71.9; 188/72.8; 188/196 D; 188/196 V; 192/111 A
[58] Field of Search ............... 188/71.9, 72.8, 196 D, 188/196 V; 192/111 A

[56] References Cited

U.S. PATENT DOCUMENTS

| | | | |
|---|---|---|---|
| 1,840,462 | 1/1932 | Moittie | 188/72.8 |
| 3,701,400 | 10/1972 | Burnett et al. | 188/72.8 |
| 3,848,705 | 11/1974 | Burnett | 188/71.9 |
| 3,952,844 | 4/1976 | Newstead et al. | 188/72.8 |
| 4,031,985 | 6/1977 | Ito | 188/71.9 |

FOREIGN PATENT DOCUMENTS 2507012 8/1975 Fed. Rep. of Germany ..... 188/71.9

Primary Examiner—Douglas C. Butler
Attorney, Agent, or Firm—Scrivener, Clarke, Scrivener and Johnson

[57] ABSTRACT

A mechanical brake actuator has rotatable and non-rotatable cam components provided with confronting helical grooves between which ball bearings are arranged to form a helical thrust bearing. A push rod, connecting rod or the like acts generally tangentially on a lever arm on the rotatable cam component for turning the latter. The lateral reaction arising from the lateral force due to the push rod is transferred from the rotatable cam component to the non-rotatable cam component by the helical thrust bearing, thereby avoiding the need to provide a separate journal bearing for the rotatable cam component. The rotatable cam component acts on a tappet member via an axial thrust bearing and an automatic adjuster mechanism.

15 Claims, 6 Drawing Figures

BRAKES

This invention relates to mechanical brakes, e.g. mechanical service brakes for railway or road vehicles.

In prior art mechanical actuators of the kind comprising face cams, as described in British Patent specification No. 1,448,978, three rolling members, such as balls, are arranged at 120° apart in corresponding helically inclined grooves or ramps in the cam components. Such an actuator is useful in connection with air operated brakes because a substantial mechanical advantage (typically 20:1) can be obtained between the air actuator and the brake operating mechanism with a high efficiency and compact dimensions.

The use of three balls at 120° apart reliably avoids tilting of the cam components relative to one another and the thrust is evenly distributed between the three balls. However the thrust which such a device is capable of attaining is limited by the Hertzian stresses at the balls. To increase the diameter of the balls in order to reduce these stresses would require a corresponding increase in diameter of the whole assembly which may not be practical. It has hitherto not been practical to employ more than three balls because of the difficulty in machining the inclined grooves or ramps with sufficient accuracy to ensure even distribution of the thrust between the balls.

Our British Patent specification No. 1,492,391 describes a mechanical brake actuator which is provided with more than three rolling members, yet may still be relatively cheap to manufacture. The mechanical brake actuator described in Specification No. 1,492,391 comprises two relatively rotatable cam components each having a respective helical cam track, the cam tracks being complementary to one another and axially confronting one another, and a plurality of rolling members between said two axially confronting helical cam tracks to form a helical thrust bearing, such that rotation of one of said cam components in an appropriate direction relative to the other effects axial displacement of that component relative to said other component. As described and illustrated, the rolling members comprise bearing needles.

One of the cam components is part of or normally fixed relatively to a housing in which the other (rotatable) component is disposed, and an elongate member extends into said housing and engages said rotatable cam component for rotating the latter in said appropriate direction whilst permitting said axial displacement. The elongate member comprises a brake cable, brake rod or the like which passes through an opening in the housing and has sufficient lateral flexibility or mobility not to hinder said axial displacement, such elongate member being placed in tension for effecting said rotation in said appropriate direction.

Since the elongate member applies a lateral force to the rotatable cam component, the latter is subjected to a reaction thrust and must be journalled in the housing in such a manner that this reaction thrust is reliably transmitted to the housing. In the mechanical actuator described in the above-mentioned application, the rotatable cam component is journalled by its outer periphery in the housing and this reaction thrust gives rise to high friction forces resisting rotation of the rotatable cam component, thereby detracting from the high efficiency theoretically possible. One way of reducing the friction would be to arrange a roller bearing journal around the rotatable cam component but this would be expensive and would substantially increase the overall dimensions of the actuator. To provide a bearing for the rotatable cam component which is small enough to have negligible friction without resorting to rolling bearings is thought to be an impractical solution to this problem.

According to the present invention a mechanical brake actuator for a vehicle brake comprises a non-rotatable cam component fixed in or integral with a housing, a rotatable cam component in the housing, the cam components each having a respective helical cam groove, the cam grooves being complementary to one another and axially confronting one another, a plurality of balls between said two axially confronting helical cam grooves to form a helical thrust bearing, and an elongate member extending generally tangentially and engaging the rotatable cam component at a point spaced from its axis for rotating the rotatable cam component in a direction to effect axial displacement of that component relative to said housing, the lateral reaction arising from the application of a lateral force to the rotatable cam component by the elongate member being transmitted to the non-rotatable cam component (and thereby to the housing) by the helical thrust bearing.

The bearing needles described in the above-mentioned Specification No. 1492391 are incapable of sustaining the lateral reaction.

Figure 3:
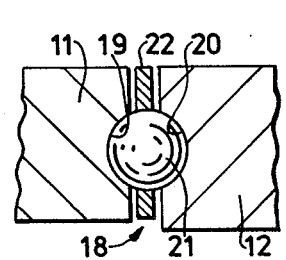
Figure 4:
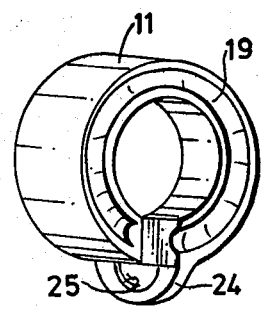
Figure 2:
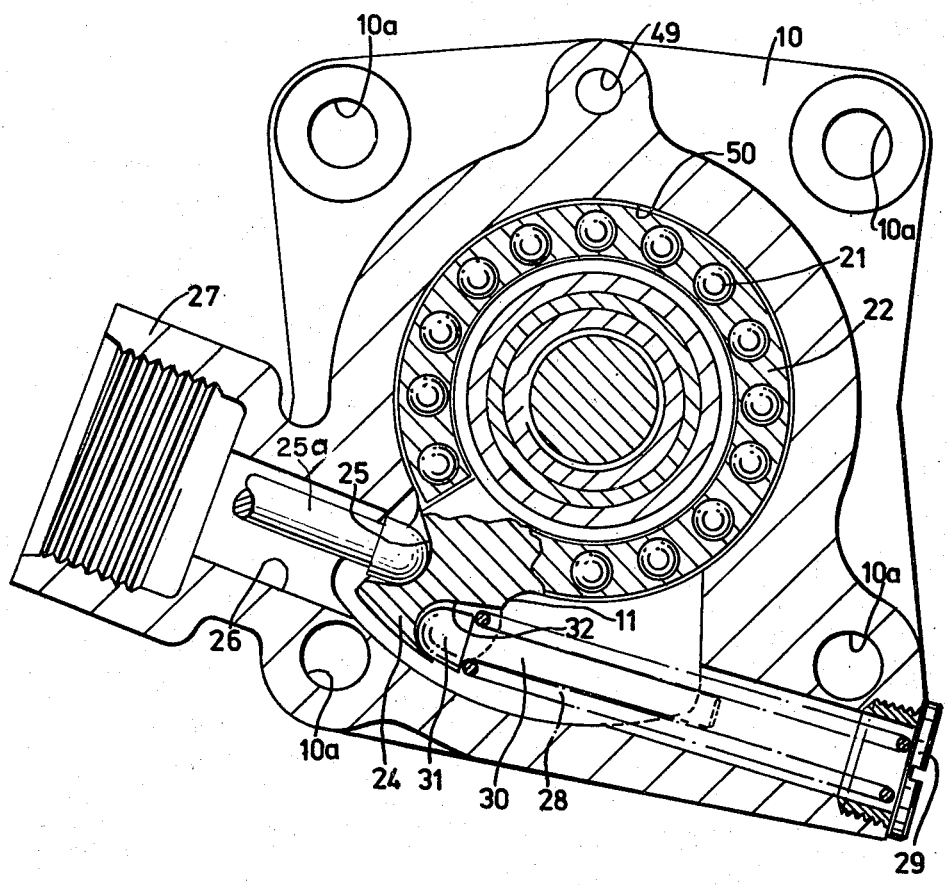
Figure 5:
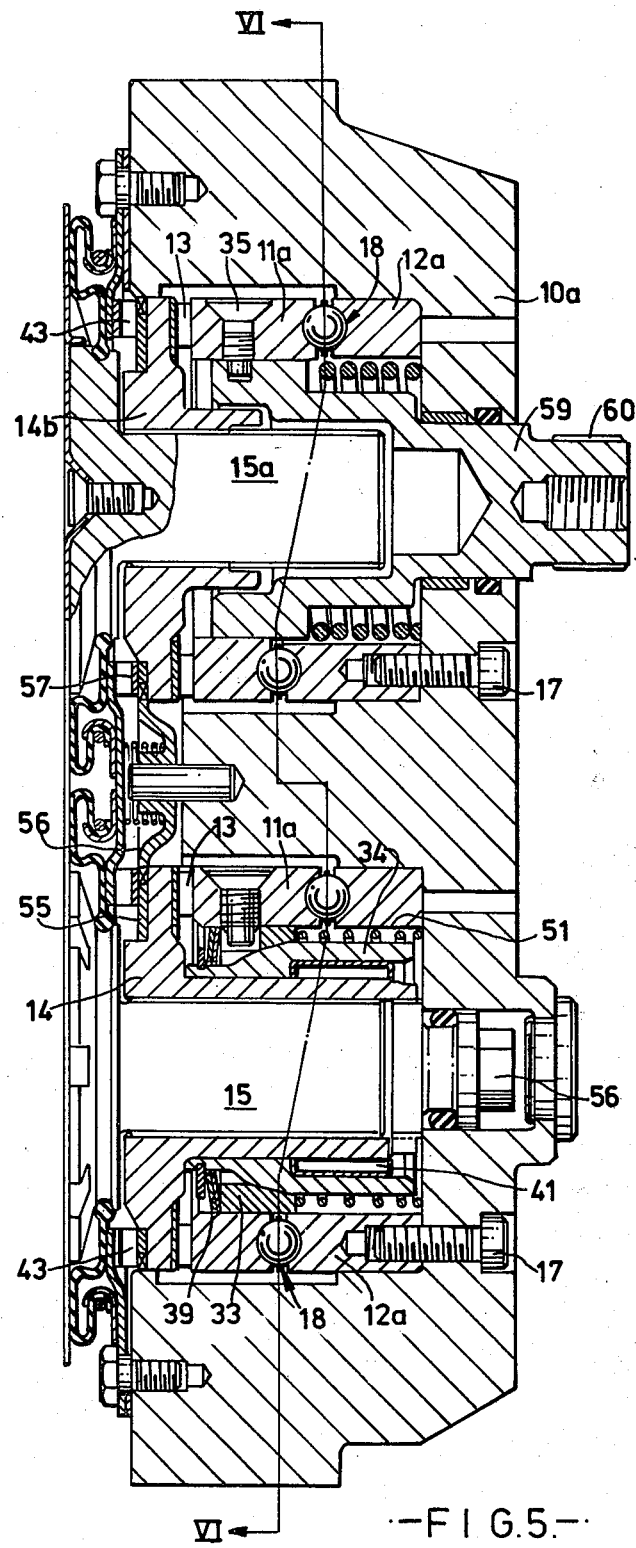
Figure 6:
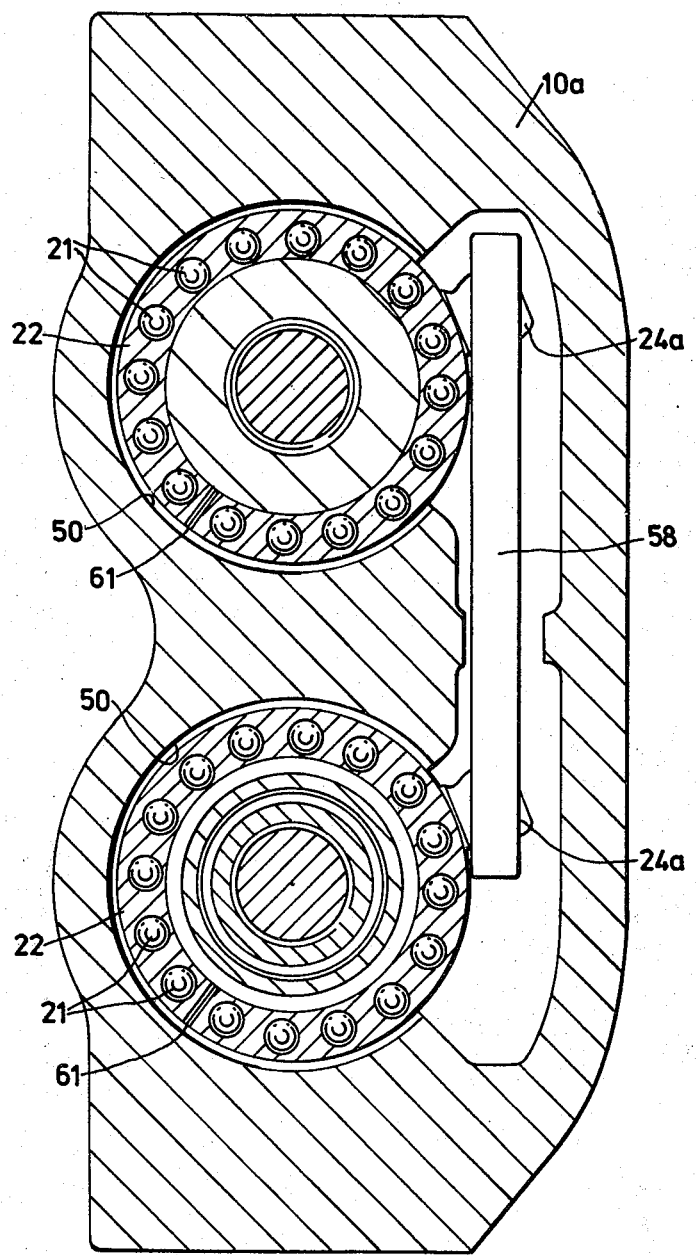

The invention is further described, by way of example, with reference to the accompanying drawings, in which:

FIG. 1 is a longitudinal sectional view of a brake actuator constructed in accordance with one embodiment of the invention, FIG. 2 is a cross section on the line II—II of FIG. 1, FIG. 3 is a fragmentary sectional view of a detail from FIG. 1 to a larger scale, FIG. 4 is a fragmentary perspective view of a cam ring of the brake actuator of FIGS. 1 to 3, FIG. 5 is a longitudinal sectional view of a second embodiment of the brake actuator according to the invention, and FIG. 6 is a sectional view on the line VI—VI of FIG. 5.

FIGS. 1 and 2 of the drawings show a mechanical actuator for a disc brake, e.g. a disc brake of a railway or road vehicle. The actuator has a housing 10 which can be attached to a floating caliper (not shown) by tie bolts passing through four holes 10a, e.g. generally as illustrated in our British Pat. No. 1,193,641. The actuator itself comprises a rotatable component 11 and a non-rotatable component 12 which are hereinafter referred to as the movable and fixed cam rings. The movable cam ring 11 acts via an axial thrust bearing 13 and a flange 14a formed on the inner end of a nut member 14. A screw member 15 which constitutes a first member of an adjuster mechanism has a non-reversible screw thread connection 16 with the nut member 14 which constitutes a second member of the adjuster mechanism. The fixed cam ring 12 is secured to the housing 10 by screws 17, but could alternatively be formed integrally with the housing.

A helical thrust bearing 18 is formed between the cam rings 11 and 12. As shown in FIG. 4 the movable cam ring 11 has at one side a helical cam groove 19. The fixed cam ring 12 has a similar complementary cam groove 20 as shown in FIG. 3. A plurality of bearing balls 21 located in a suitable cage 22 is disposed between the cam grooves 19 and 20 to form the helical thrust bearing. The arrangement therefore is that, when the cam ring 11 is rotated in an appropriate direction (anticlockwise in FIG. 2) the cam rings 11 and 12 are urged axially apart by the helical thrust bearing 19. This thrust is transmitted to the nut member 14 via the thrust bearing 13, which may comprise needle rollers, and from the nut member 14 via the screw member 15 to a tappet member 23 which acts on a directly operated pad assembly (not shown). The directly operated pad assembly is arranged to engage one side of a brake disc and a indirectly operated pad assembly supported by the caliper to which the housing 10 is secured is arranged to engage the opposite side of the disc. Thus the brake is of the reaction type and it will be noted that the reaction which is received by the cam ring 12 is applied directly to the end wall 64 of the housing 10.

For turning the cam ring 11 the cam ring is provided with a radially projecting lever arm 24 having a circular depression 25 which may be engaged by a domed end of a push rod 25a extending through an opening 26 in the wall of the housing 10 generally tangentially with respect to the movable cam ring 11. The housing 10 is provided with a boss 27 to which an air cylinder can be attached, a piston movable in the air cylinder being arranged to act on the piston rod. A cam return spring 28 resting against an abutment screw 29 acts on the lever arm 11 in a generally tangential direction via an abutment member 30 having a domed end 31 which is received in a second circular depression 32 in the lever arm 11 at the opposite side thereof to the depression 25. It will be noted that both the abutment member 30 and the not illustrated piston rod acting on the lever arm 11 have lateral mobility to enable them to follow the axial displacement of the cam ring 11 which takes place upon the rotation thereof.

The adjuster mechanism which includes the members 14 and 15 further comprises a third member which is in the form of an outer annular member 33, a fourth member in the form of an inner annular member 34 and a key in the form of a screw 34 which is screwed radially into the cam ring 11. The inner end of the screw 35 is received with circumferential clearance in an axial slot or groove 36 in the annular member 33 to form a rotary lost motion connection between the cam ring 11 and the member 33. The extent of the rotary lost motion determines the desired brake slack as will be described hereinafter.

Co-operating frusto-conical and part spherical friction surfaces 37 and 38 are formed respectively on the outer and inner annular members 33 and 34 and are biassed into engagement with one another by spring washers 39 to form a slipping clutch which has a slip torque predetermined by the compression of the spring washers 39. The spring washers 39 are disposed between the member 33 and a spring ring abutment 40 received in an annular groove in the inner member 34. A so-called sprag clutch 41 is arranged between the inner annular member 34 and the nut member 14. A sprag clutch is a one-way clutch and acts in a similar manner to a roller clutch. In other words, the member 34 has a plurality of internal teeth having ramp surfaces which co-operate with rolling members or the like which in turn co-operate with the outer cylindrical surface 42 of the nut member 14.

A tappet return spring 43 acts between a cover member 44 secured to the housing 10 and the flange 14a, the tappet member 23 being secured to the screw member 15 by a screw 45. A flexible rubber cover 46 is arranged between an outward flange 65 on the screw member 15 and the cover 44 to protect the adjuster mechanism.

A spring 51 acts between the outer annular member 33 and the housing 10 but is substantially weaker than the spring washers 39 so that it merely acts to hold the inner annular member 34 against the flange 14a.

An eccentrically disposed rod 47 projects axially from a tab 48 formed on the tappet member 23 and extends into a bore 49 in the housing 10 to prevent the tappet member 23 from turning. No reliance is therefore placed upon the friction pad assemblies to prevent turning of the tappet member. The tappet member 23 is keyed to the flange 65 on the screw member 15 to prevent the latter from turning. The mode of operation of the adjuster mechanism and the manner in which over adjustment in the event of caliper deflection is prevented are described fully in our earlier British Patent specification No. 1,492,391.

Because the thrust from the air cylinder is applied to the movable cam ring 11 a reaction is developed and this reaction must be taken by the housing 10. The reaction, which is in a radial direction, is transmitted by the helical thrust bearing 18 by virtue of the fact that a helical thrust bearing as shown is capable of withstanding not only an axial load but also a certain amount of radial loading due to the engagement of the balls 21 in the grooves 19 and 20. The helical thrust bearing 18 thereby behaves also as a journal bearing for journalling the movable cam ring 11 with relatively low friction. Since there will inevitably be a small amount of radial displacement of the movable cam ring 11 under the effect of the force applied by the air cylinder, the outer diameter of the movable cam ring 11 is smaller than that of the fixed ring 12 so that there is clearance with respect of the inner wall 50 of the housing 10. It will be noted in FIG. 3 that the cam grooves 19, 20 are sufficiently deep so that the lateral thrust from the rotatable member 11 is transmitted to the non-rotatable member by the action of the balls of the thrust member on the walls of the grooves. It will also be noted in FIG. 3 that the cage 22 is sufficiently narrow in axial cross section as not to interfere with the confronting faces of the rotatable and non-rotatable members when the balls are received in the respective helical grooves.

A reset member 52 is sealed to an access bore 53 in the housing 10 and has a dog clutch-like connection 54 with the nut member 14. For resetting the adjuster, e.g. when worn pads are replaced by new pads, a cover 55 is removed from the access bore 53 to enable a suitable tool to be applied to a hexagonal head of the reset member 52 so that the nut member 14 can be screwed back on the screw member 15.

The embodiment of FIGS. 5 and 6 is much the same as that of FIGS. 1 to 4 expect that it comprises two mechanical actuators arranged parallel to each other in the housing 10a for the purpose of applying relatively large brake pads against the brake disc. Parts like those of FIGS. 1 to 4 are denoted by like reference numerals. However, it will be seen that only the lower mechanical actuator in FIG. 5 is provided with an automatic adjuster mechanism like that of FIG. 1. The upper mechanical actuator has an adjuster mechanism comprising a nut member 14b in screw-thread connection with a screw member 15a. The nut member 14 of the lower actuator mechanism has a gear wheel 55 fixed thereto and in mesh with an idler gear wheel 56 which in turn meshes with a gear wheel 57 attached to the nut member 14b. The nut member 14b is thereby caused to automatically participate in the adjustments effected upon the nut member 14.

As can be seen in FIG. 5, the movable cam rings 11a of the upper and lower actuators have lever arms 24a which are interconnected by a connecting rod 58. The movable cam 11a of the upper mechanical actuator is coupled by the screw 35 with an input shaft 59 which is journalled in the housing 10a in axial alignment with the members 14b and 15a. The shaft 59 has a splined end 60 by which the member 59 can be rotated from an external source, e.g. from an air cylinder and crank system. The rotary movement inparted to the upper cam ring 11a by the input shaft 59 is transmitted to the lower cam ring 11a by the connecting rod 58. As in the preceding embodiment the reactions from the forces applied to the cam rings 11a by the connecting rod 58 are transmitted to the fixed cam rings 12a by the helical thrust bearings 18.

The cam rings 11 and 12 and 11a and 12a can be manufactured by cold forging or sintering or by hot forging and the helical cam tracks 19 and 20 of arcuate cross-section can be finished by coining or by machining. Another possibility is for the cam rings to be machined from solid bar. A further possibility is for part circular ramps to be formed initially flat, say as extruded stock, which is then cut into lengths and bent to a helical shape. In this last case the part circular ramps would have to be backed up by helical cam rings as illustrated in the earlier patent application mentioned above and secured against movement relative thereto.

As can be seen most clearly in FIG. 6, the cage 22 for the balls 21 is split at 61, whereby a conventional thrust bearing cage can be adapted for use in the helical thrust bearing 18.

We claim:

1. A mechanical brake actuator for a vehicle brake comprising a housing having an axis, a non-rotatable cam component fixed in or integral with said housing, a rotatable cam component in said housing and rotatable about said axis, said rotatable cam component being radially spaced from said housing throughout its circumference to define an annular clearance, said cam components each having a respective helical cam groove therein, said cam grooves being complementary to one another and axially confronting one another, a plurality of balls between said two axially confronting helical cam grooves to form a helical thrust bearing, and an elongate member extending generally tangentially and engaging said rotatable cam component at a point spaced from said axis for rotating the rotatable cam component in a direction to effect axial displacement of that component relative to said housing, said helical cam grooves having sufficient depths that the lateral reaction arising from the application of a lateral force to the rotatable cam component by said elongate member is transmitted to said non-rotatable cam component and thereby to said housing by the action of the balls of said helical thrust bearing on the walls of said helical grooves.

2. A brake actuator according to claim 1, in which said helical thrust bearing includes a cage for said balls, said cage having a circumferential discontinuity.

3. A brake actuator according to claim 1, in which said rotatable cam component has a radially projecting lever arm thereon, said elongate member being adapted to engage said lever arm.

4. A brake actuator according to claim 3, in which said lever arm has a circular depression therein and said elongate member comprises a push rod having an end adapted to engage in said circular depression.

5. A brake actuator according to claim 4, further comprising a return spring acting generally tangentially on said lever arm.

6. A brake actuator according to claim 3, further comprising second non-rotatable and rotatable cam components arranged alongside the first-mentioned non-rotatable and rotatable cam components and having respective confronting helical cam grooves therein with balls located between such grooves to define a second helical thrust bearing, and means for rotating said second rotatable cam component, said second rotatable cam component having a radially projecting lever arm thereon and said elongate member comprising a connecting rod articulated to said lever arms, whereby rotation of said second rotatable cam component by said means for rotating effects rotation of said first-mentioned rotatable cam component.

7. A brake actuator according to claim 6, in which said means for rotating said second rotatable cam component comprises input shaft means rotatably journalled in said housing and means coupling said input shaft means to said second rotatable cam component.

8. A brake actuator according to claim 6, which further comprises non-rotatable tappet means, axial thrust bearings and adjuster mechanisms, each adjuster mechanism comprising nut and screw members threaded together, each said rotatable cam component acting on said tappet means via a respective one of said axial thrust bearings and a respective one of said adjuster mechanisms.

9. A brake actuator according to claim 8, in which one of said nut and screw members of each said adjuster mechanism is non-rotatable and the other is rotatable and in which one of said adjuster mechanisms is automatic and further comprises means for rotating its said rotatable member responsively to a requirement for adjustment and means are provided for transmitting the rotary movement of said rotatable member of said one adjuster mechanism to said rotatable member of said other adjuster mechanism.

10. A brake actuator according to claim 1, further comprising a non-rotatable tappet member and an axial thrust bearing, said rotatable cam component acting via said axial bearing at least indirectly on said tappet member.

11. A brake actuator according to claim 10, in which said housing has an eccentrically disposed axial bore and said tappet member has an eccentrically disposed axially extending rod thereon, said rod extending into said housing bore to restrain rotation of said tappet member.

12. A brake actuator according to claim 10, which further comprises an automatic adjuster mechanism which includes nut and screw members threaded together and operatively arranged between said axial thrust bearing and said tappet member, and means for effecting relative rotation between said nut and screw members responsively to a requirement for adjustment.

13. A brake actuator according to claim 12, in which said cam components are annular and encircle said nut and screw members.

14. A brake actuator according to claim 12, in which said screw member is attached to said tappet member and in which said nut member has a flange thereon, said rotatable cam component acting via said axial thrust bearing on said flange.

15. A brake actuator according to claim 12, in which said means for effecting relative rotation comprise third and fourth adjuster members and a rotary last-motion connection, a slipping clutch and a one-way clutch operatively arranged in any order between said rotatable cam component, said third member, said fourth member and a rotatable one of said screw and nut members.

* * * * *